United States Patent
Ramu (10) Patent No.: US 8,952,591 B2
(45) Date of Patent: Feb. 10, 2015

(54) ROTOR LAMINATION SHAPING FOR MINIMUM CORE LOSS IN SRMS

(75) Inventor: Krishnan Ramu, Blacksburg, VA (US)

(73) Assignee: Regal Beloit America, Inc., Beloit, WI (US)

( * ) Notice: Subject to any disclaimer, the term of this patent is extended or adjusted under 35 U.S.C. 154(b) by 363 days.

(21) Appl. No.: 13/285,176

(22) Filed: Oct. 31, 2011

(65) Prior Publication Data
US 2012/0104982 A1 May 3, 2012

Related U.S. Application Data

(60) Provisional application No. 61/409,638, filed on Nov. 3, 2010.

(51) Int. Cl.
- H02K 1/24 (2006.01)
- H02K 19/06 (2006.01)
- H02K 1/32 (2006.01)
- H02K 15/12 (2006.01)

(52) U.S. Cl.
CPC ............... *H02K 1/24* (2013.01); *Y02T 10/641* (2013.01); *H02K 15/12* (2013.01)
USPC ............... 310/216.107; 310/61; 310/216.075; 310/216.077

(58) Field of Classification Search
USPC .............. 310/61, 216.075, 216.076, 216.077, 310/216.106, 216.107
See application file for complete search history.

(56) References Cited

U.S. PATENT DOCUMENTS

| | | |
|---|---|---|
| 4,217,511 A | 8/1980 | King, Jr. et al. |
| 4,475,051 A | 10/1984 | Chai et al. |
| 4,725,751 A | 2/1988 | Bassler et al. |
| 4,743,825 A | 5/1988 | Nashiki |
| 4,990,809 A | 2/1991 | Artus et al. |
| 5,005,281 A | 4/1991 | Burns |
| 5,015,903 A | 5/1991 | Hancock et al. |
| 5,053,666 A | 10/1991 | Kliman et al. |
| 5,250,867 A | 10/1993 | Gizaw |
| 5,604,388 A | 2/1997 | Baker et al. |
| 5,739,615 A | 4/1998 | McClelland |
| 5,838,087 A | 11/1998 | Tang |
| 5,864,477 A | 1/1999 | Webster |
| 5,909,071 A * | 6/1999 | Sakuma et al. ................ 310/51 |

(Continued)

FOREIGN PATENT DOCUMENTS

| | | |
|---|---|---|
| CH | 0153588 A | 3/1932 |
| CN | 103190069 A | 7/2013 |

(Continued)

OTHER PUBLICATIONS

International Preliminary Report on Patentability issued in International PCT Application No. PCT/US2011/058539 mailed on Mar. 6, 2014.

(Continued)

*Primary Examiner* — Burton Mullins
(74) *Attorney, Agent, or Firm* — Armstrong Teasdale LLP (57) ABSTRACT

An electrical machine rotor includes a flux-conducting portion and a flux-inhibiting portion. The flux-conducting portion is conducive to conveying an electromagnetic flux and has a plurality of salient rotor poles and a portion of back material. The flux-inhibiting portion is less conducive to conveying an electromagnetic flux than the flux-conducting portion and is disposed entirely outside the boundaries of the rotor poles.

15 Claims, 7 Drawing Sheets

(56) References Cited

U.S. PATENT DOCUMENTS

| | | | |
|---|---|---|---|
| 6,037,740 | A | 3/2000 | Pollock et al. |
| 6,043,574 | A | 3/2000 | Prudham |
| 6,091,168 | A * | 7/2000 | Halsey et al. .......... 310/216.107 |
| 6,483,210 | B1 * | 11/2002 | Soderberg .................... 310/52 |
| 6,720,686 | B1 | 4/2004 | Horst |
| 6,849,985 | B2 | 2/2005 | Jack et al. |
| 6,988,689 | B2 | 1/2006 | Thomas et al. |
| 7,271,564 | B2 | 9/2007 | Ramu |
| 7,468,570 | B2 | 12/2008 | Ionel et al. |
| 7,528,516 | B2 | 5/2009 | Mipo et al. |
| 7,732,967 | B2 | 6/2010 | Vollmer et al. |
| 8,004,141 | B2 | 8/2011 | Jeung |
| 8,089,192 | B2 | 1/2012 | Li et al. |
| 8,102,093 | B2 | 1/2012 | Prudham |
| 8,754,605 | B2 | 6/2014 | Ramu |
| 2004/0008003 | A1 | 1/2004 | Turner |
| 2004/0021395 | A1 | 2/2004 | Maslov et al. |
| 2004/0085040 | A1 | 5/2004 | Chen |
| 2005/0156475 | A1 | 7/2005 | Ramu et al. |
| 2006/0232069 | A1 | 10/2006 | Lim et al. |
| 2006/0273680 | A1 | 12/2006 | Ramu et al. |
| 2007/0008744 | A1 | 1/2007 | Heo et al. |
| 2007/0182383 | A1 | 8/2007 | Park et al. |
| 2007/0273322 | A1 | 11/2007 | Ramu |
| 2008/0030092 | A1 | 2/2008 | Cusicanqui |
| 2008/0246362 | A1 | 10/2008 | Hirzel |
| 2009/0045768 | A1 | 2/2009 | Ramu |
| 2010/0060223 | A1 | 3/2010 | Sakai et al. |
| 2010/0141061 | A1 | 6/2010 | Ramu et al. |
| 2010/0181858 | A1 | 7/2010 | Hibbs et al. |

FOREIGN PATENT DOCUMENTS

| | | | | |
|---|---|---|---|---|
| DE | 10229333 | | 1/2004 | |
| EP | 2636141 | A1 | 9/2013 | |
| FR | 317609 | | 9/1902 | |
| FR | 856500 | | 6/1940 | |
| JP | 47-42256 | | 12/1972 | |
| JP | 51-125804 | | 2/1976 | |
| JP | 55-94548 | * | 7/1980 | ............ H02K 1/20 |
| JP | 58-165640 | * | 9/1983 | ............ H02K 1/32 |
| JP | 64-69239 | * | 3/1989 | ............ H02K 9/02 |
| WO | 2009023205 | A1 | 2/2009 | |
| WO | 2012061271 | A2 | 5/2012 | |
| WO | 2012061273 | A2 | 5/2012 | |
| WO | 2012061456 | A1 | 5/2012 | |
| WO | 2012061458 | A1 | 5/2012 | |

OTHER PUBLICATIONS

International Search Report and Written Opinion issued in International PCT Application No. PCT/US2011/058539 mailed on Feb. 1, 2013.

International Search Report and Written Opinion issued in International PCT Application No. PCT/US2011/058887 mailed on Mar. 7, 2012.

International Search Report and Written Opinion issued in International PCT Application No. PCT/US20111058890 mailed on Mar. 7, 2012.

International Preliminary Report on Patentability, issued in International PCT Application No. PCT/US20111058536 mailed on May 27 2014.

International Search Report and Written Opinion issued in International PCT Application No. PCT/US20111058536 mailed on May 15, 2014.

Chinese Patent Application No. 201180053210.1 filed May 3, 2013.
European Patent Application No. 2011838721.6 filed May 3, 2013.

* cited by examiner

ROTOR LAMINATION SHAPING FOR MINIMUM CORE LOSS IN SRMS

This application claims priority to U.S. provisional application 61/409,638 filed on Nov. 3, 2010, the content of which is incorporated herein by reference.

BACKGROUND OF THE RELATED ART

Figure 1:
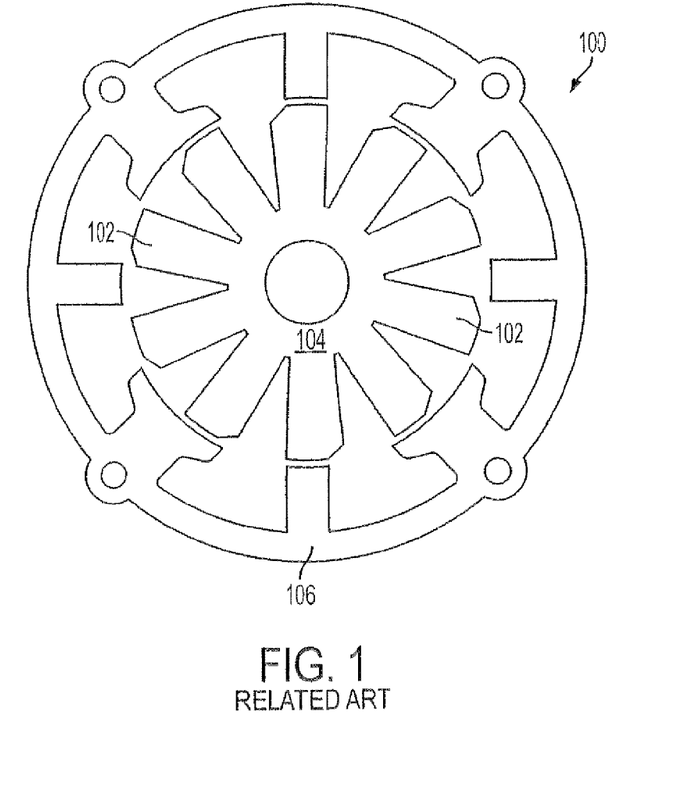
FIG. 1 illustrates a related-art switched reluctance machine (SRM) having long rotor poles and a narrow back iron.

FIG. 1 illustrates a related-art switched reluctance machine (SRM) 100 having long rotor poles 102 and a back iron 104 that is narrow, but sufficient to carry flux for the SRM's intended use. The flux path within SRM 100 traverses through the entire heights of rotor poles 102. The long rotor poles 102 of SRM 100 create two drawbacks: (i) the flux path through the long rotor poles is longer than necessary and (ii) the greater weight of the rotor laminations, due to the length of the rotor poles, results in high core losses.

SUMMARY OF THE INVENTION

The invention disclosed herein overcomes the high core loss existing in related-art switched reluctance machines (SRMs) due to long flux paths in the rotor.

These and other objects of the invention may be achieved, in whole or in part, by an electrical machine rotor that includes a flux-conducting portion and a flux-inhibiting portion. The flux-conducting portion is conducive to conveying an electromagnetic flux and has a plurality of salient rotor poles and a portion of back material. The flux-inhibiting portion is less conducive to conveying an electromagnetic flux than the flux-conducting portion and is disposed entirely outside the boundaries of the rotor poles.

Additionally, the objects of the invention may be achieved, in whole or in part, by an electrical machine rotor having a back material, a plurality of salient rotor poles radially extending from the perimeter of the back material, a flux-conducting portion, and a flux-inhibiting portion. The flux-conducting portion is conducive to conveying an electromagnetic flux and this portion includes the rotor poles and a first portion of the back material. The flux-inhibiting portion is less conducive to conveying an electromagnetic flux than the flux-conducting portion. The back material portion of the flux-conducting portion is disposed circumferentially around the rotor as an annular ring that forms the outer perimeter of the rotor between adjacent rotor poles. The first portion of the back material is capable of conveying as much electromagnetic flux away from each rotor pole, without saturating, as the rotor pole is capable of conveying to the first portion of the back material, without saturating. The flux-inhibiting potion is disposed within the back material at a lesser radial distance from the rotational axis of the rotor than the first portion of the back material.

Still further, the objects of the invention may be achieved, in whole or in part, by a system that identifies operational phases of an electrical machine. The system includes a rotor of the electrical machine; a first detector that detects the passage of a light beam through a first hole formed between opposing surfaces of the rotor; a second detector that detects the passage of a light beam through a second hole formed between the opposing surfaces of the rotor; and a phase identifying component that identifies the occurrence of a first operational phase of the machine based upon the detection of light passing through the first hole and identifies the occurrence of a second operational phase of the machine based upon the detection of light passing through the second hole. The first hole has a different radial distance from the rotational axis of the rotor than does the second hole.

Still further, the objects of the invention may be achieved, in whole or in part, by a method for identifying operational phases of an electrical machine. The method includes detecting the passage of a light beam through a first hole formed between opposing surfaces of a rotor of the electrical machine; identifying the occurrence of a first operational phase of the machine based upon the detection of light passing through the first hole; detecting the passage of a light beam through a second hole formed between the opposing surfaces of the rotor; and identifying the occurrence of a second operational phase of the machine based upon the detection of light passing through the second hole. The first hole has a different radial distance from the rotational axis of the rotor than does the second hole.

BRIEF DESCRIPTION OF THE DRAWINGS

Preferred embodiments of the invention are described in the following paragraphs of the specification and may be better understood when read in conjunction with the attached drawings, in which.

DETAILED DESCRIPTION OF THE INVENTION

Figure 2:
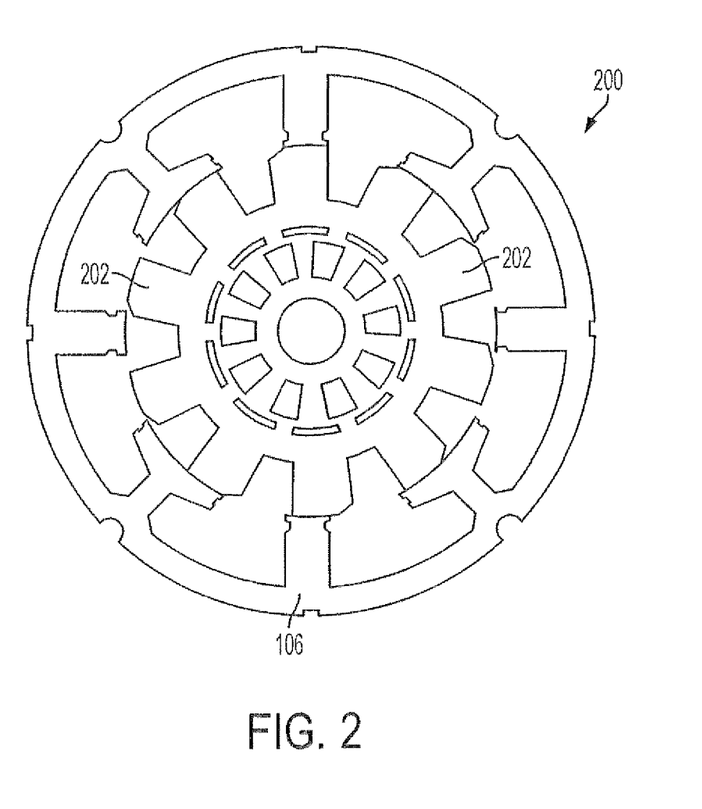
FIG. 2 illustrates an SRM having a reduced flux path length for reducing core losses.

FIG. 2 illustrates a switched reluctance machine (SRM) 200 having a reduced flux path length for reducing core losses. More specifically, the length of rotor poles 202 within SRM 200 are shorter than rotor poles 102 within related-art SRM 100.

Figure 3:
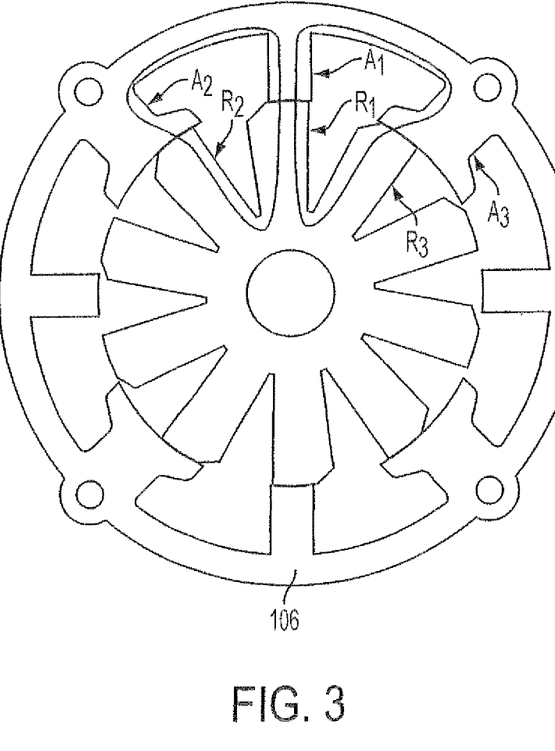
FIG. 3 illustrates the SRM of FIG. 1 and the flux paths generated by an excitation pole A1 when a phase A of the SRM is excited.
Figure 4:
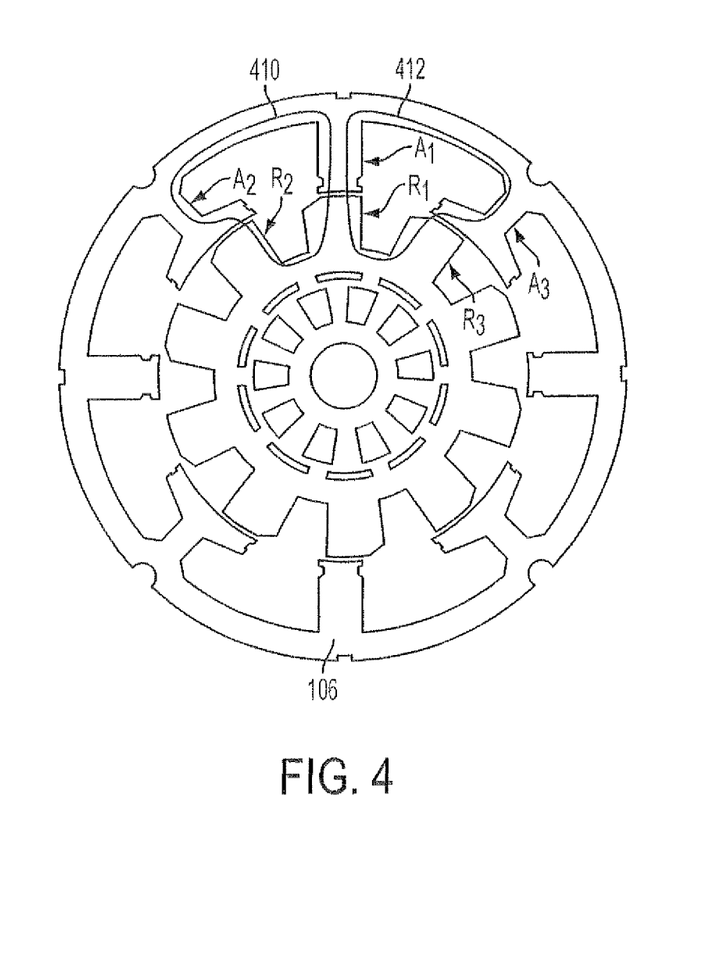
FIG. 4 illustrates the SRM of FIG. 2 and the flux paths generated by an excitation pole A1 when a phase A of the SRM is excited.

FIG. 3 illustrates SRM 100 of FIG. 1 and the flux paths generated by an excitation pole A1 when a phase A of SRM 100 is excited. Similarly, FIG. 4 illustrates SRM 200 of FIG. 2 and the flux paths generated by an excitation pole A1 when a phase A of SRM 200 is excited. In each of SRMs 100 and 200, the generated flux is conveyed through excitation pole A1, crosses the air gap between excitation pole A1 and a rotor pole R1, and divides into two pathways within rotor pole R1. One flux pathway travels through the rotor back iron between rotor poles R1 and R2 and the other through the rotor back iron between rotor poles R1 and R3. The flux traveling through the rotor back iron between rotor poles R1 and R2 is conveyed through rotor pole R2, across the air gap between rotor pole R2 and a stator pole A2, and returns to excitation pole A1 through stator back iron 106. Similarly, the flux traveling through the rotor back iron between rotor poles R1 and R3 is conveyed through rotor pole R3, across the air gap between rotor pole R3 and a stator pole A3, and returns to excitation pole A1 through stator back iron 106.

Although there is no significant difference in the stator flux paths for SRMs 100 and 200, a significant difference exists in their rotor flux paths because the length of rotor pole 202 within SRM 200 is shorter than that of rotor pole 102 within SRM 100. As may be determined by inspection of FIG. 4, flux path 410 passes through each of rotor poles R1 and R2 and flux path 412 passes through each of rotor poles R1 and R3. Because each of rotor poles R1, R2, and R3 within SRM 200 is shorter than its counterpart within SRM 100, the total rotor flux path length for each of flux paths 410 and 412 is considerably reduced even though the flux path length through the rotor back iron of SRM 200 is greater than that of SRM 100. Thus, assuming that the rotors of SRMs 100 and 200 are capable of conveying the same amount of flux using the same type of material, the rotor of SRM 200 can do so with less material than that of SRM 100. The lesser amount of material reduces the weight and core losses of the rotor of SRM 200 with respect to that of SRM 100.

Figure 5:
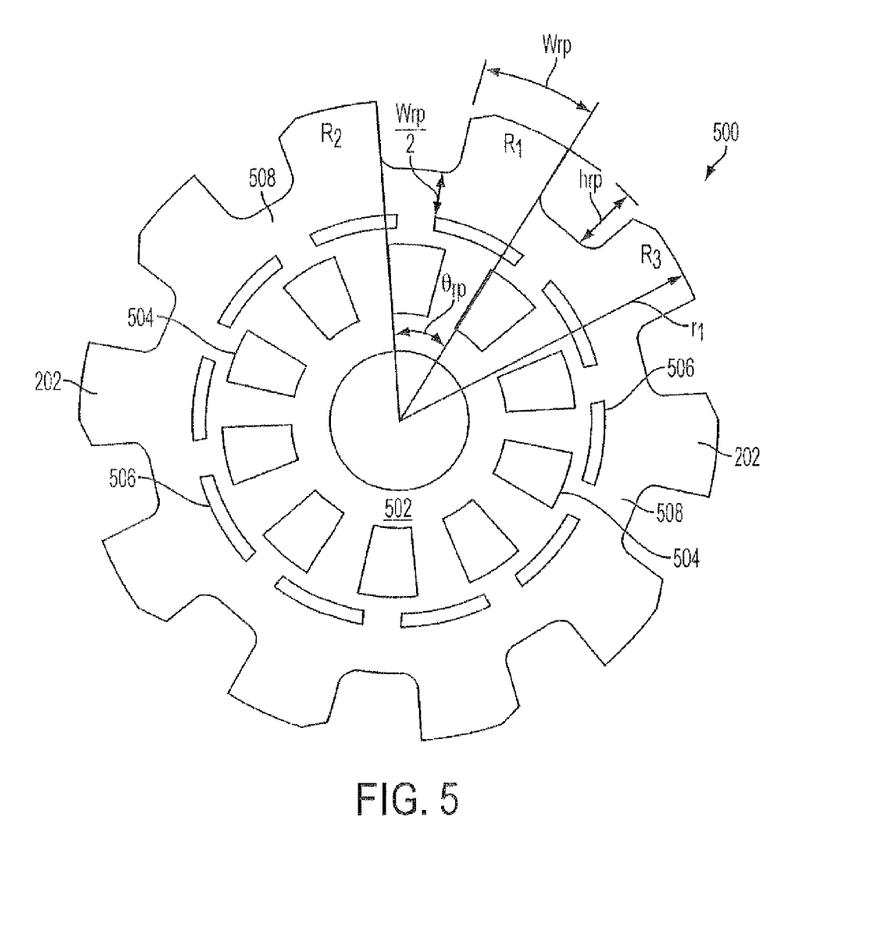
FIG. 5 illustrates the rotor of the SRM from FIG. 2 in greater detail.

FIG. 5 illustrates the rotor of SRM 200 in greater detail. Rotor 500 has shaped air slots 504, 506 in back iron 502 of the rotor material to inhibit the flow of flux through the portions of back iron 502 having, or obstructed by, air slots 504, 506. Shaped air slots 504, 506 may have various shapes, such as the shape of air slot 504 and that of air slot 506. Shaped air slots 504 form a first layer of air slots within rotor 500 and shaped air slots 506 form a second layer of air slots; the first layer of air slots being disposed closer to the rotational axis of rotor 500 than the second layer. Fewer or more layers may be used. Because air slots 504, 506 inhibit the flow of flux, the flux flowing between two rotor poles, such as R1 and R2 or R1 and R3, is induced to pass through a shorter path of less resistance (i.e., reluctance), within back iron 508, that is close to rotor poles 202. The absence of material in shaped air slots 504, 506 decreases the weight and inertia of rotor 500, which helps increase the acceleration of the machine and contributes to a faster speed-loop bandwidth of the machine.

The reduction in flux-path length between SRM 200 and SRM 100 is derived as follows. Rotor pole R1 has height $h_{rp}$, pole arc $w_{rp}$, outer radius $r_1$, and rotor pole pitch $\theta_{rp}$. Because the flow of flux through rotor pole R1 is divided in two between two paths 410, 412, as the flux flows through rotor back iron 508, the thickness of rotor back iron 508 needs only be half the arc of rotor pole R1. Thus, the mean length of the rotor flux path is:

$$l_{fr} = l_{\text{flux in rotor}} = 2h_{rp} + 2\frac{w_{rp}}{4} + \left\{r_1 - \left(h_{rp} + \frac{w_{rp}}{4}\right)\right\}\theta_{rp} \quad \text{eq. (1)}$$

$$= 2h_{rp} + \frac{w_{rp}}{2} + \left(r_1 - h_{rp} - \frac{w_{rp}}{4}\right)\theta_{rp}$$

$$= h_{rp}[2 - \theta_{rp}] + r_1\theta_{rp} + \frac{w_{rp}}{2}\left[1 - \frac{\theta_{rp}}{2}\right]$$

Assuming SRMs 100 and 200 have equal values of $w_{rp}$, $r_1$, and $\theta_{rp}$, the difference between their mean rotor flux-path lengths is:

$$l_{fc} - l_{fn} = h_{rpc}[2 - \theta_{rp}] + h_{rpn}[\theta_{rp} - 2] \quad \text{eq. (2)}$$

where $l_{fc}$ is the mean flux-path length for SRM 100, $l_{fn}$ is the mean flux-path length for SRM 200, $h_{rpc}$ is the height of rotor pole 102, and $h_{rpn}$ is the height of rotor pole 202.

Let: $h_{rpc} > h_{rpn}$ $$h_{rpc} = (1+k)h_{rpn} \quad \text{eq. (3)}$$

and the difference in mean length of the rotor flux paths is:

$$\Delta l_f = l_{fc} - l_{fn} = (1+k)h_{rpn}\{2-\theta_{rp}\} + h_{rpn}\{\theta_{rp} - 2\} = kh_{rpn}[2 - \theta_{rp}] \quad \text{eq. (4)}$$

$\theta_{rp} < 1$, typically ¼ or ⅓, and the difference in rotor pole heights between SRMs 100 and 200 is:

$$\Delta h_{rp} = h_{rpc} - h_{rpn} \quad \text{eq. (5)}$$

Therefore, $\Delta l_f = [2 - \theta_{rp}]\Delta h_{rp}$ \quad eq. (6)

Therefore, $\Delta l_f \approx 2(\Delta h_{rp})$ $$R_r = \text{Reluctance of rotor flux path} = \left\{\frac{l_f}{A\mu_0\mu_r}\right\}$$

$$\text{Reluctance decreases by } \Delta R_r = \frac{\Delta l_f}{A\mu_0\mu_r}$$

where $\Delta l_f$ is the change in the flux path length and is proportional to the amount of material that is not experiencing flux changes and flux. Because SRM 200 has a smaller flux path length, its core losses and excitation requirement are lower.

The ratio of SRM 200's rotor flux-path reduction, calculated above, to the flux-path length within SRM 100 may be expressed through the equations:

$$w_{rp} = (k_2\theta_{rp})r_1$$

$$0.3 < k_2 < 0.55$$

$$\therefore \frac{\Delta l_f}{l_c} = \frac{(2-\theta_{rp})\Delta h_{rp}}{(2-\theta_{rp})h_{rpc} + r_1\theta_{rp} + k_2\theta_{rp}r_1\left(1 - \frac{\theta_{rp}}{2}\right)}$$

$$= \frac{(2-\theta_{rp})\Delta h_{rp}}{(2-\theta_{rp})h_{rpc} + r_1\theta_{rp}\left\{1 + k_2 - \frac{k_2\theta_{rp}}{2}\right\}}$$

Suppose, for example, that
$r_1 = 5$ cm; $k_2 = 0.55$
$h_{rpn} = 1$ cm
$\Delta h_{rp} = 1.72$ cm
$\theta_{rp} = 36° = 0.63$ rad
$w_{rp} = k_2 r_1 \theta = 1.72$ cm $$\frac{\Delta l_f}{l_c} = 0.2594.$$

This example indicates a 25.94% reduction in SRM 200's mean rotor flux-path length, with a concomitant reduction of core loss in the rotor laminations. Core losses, for high-speed or high-efficiency machines, may be as much as 6 to 8% of the input power.

Figure 6:
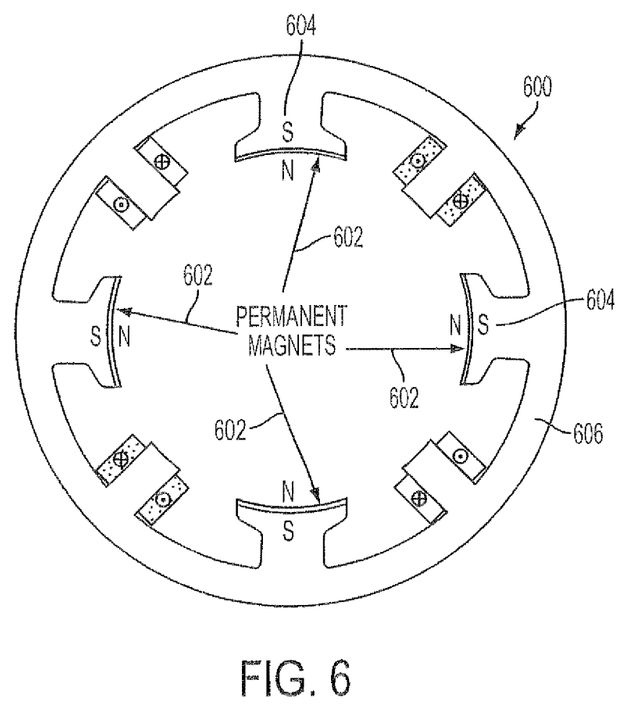
FIG. 6 illustrates an SRM having permanent magnets installed on the faces of common poles.

FIG. 6 illustrates a stator 600 having permanent magnets 602 installed on the faces of common poles 604. Stator 600 may also have additional or alternative magnets (not shown) inserted into back iron 606. Permanent magnets 602 have polarities 'N' for the north pole and 'S' for the south pole. Employing rotor 500 with stator 600, so as to reduce core loss and weight of an SRM, does not affect the operation of such an SRM.

Figure 7:
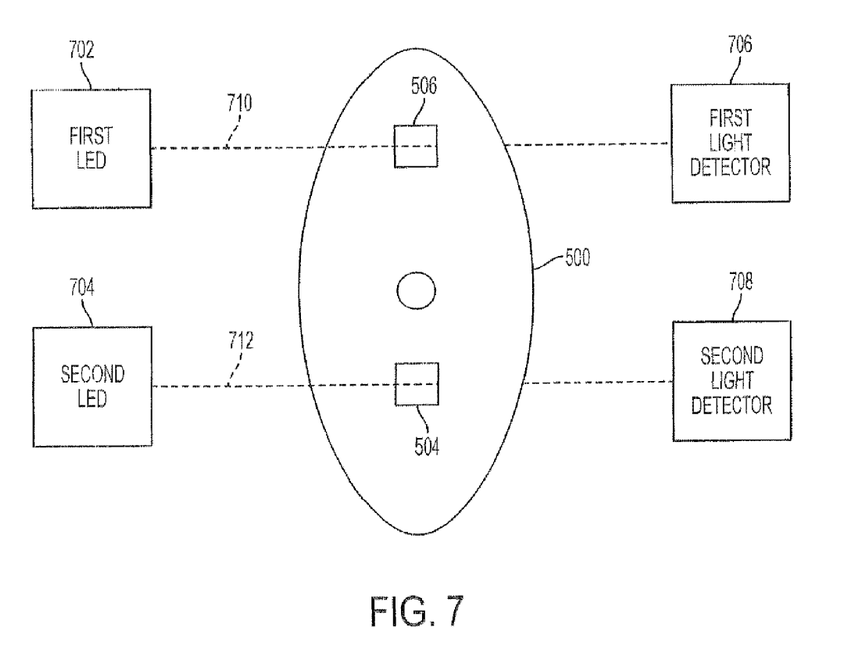
FIG. 7 illustrates components of a system for detecting the position of an SRM rotor.

Air slots 504, 506 within rotor 500 can also be used for sensing the position of rotor 500, without a physical rotary position sensor, such as an encoder. FIG. 7 illustrates components of a system for detecting the position of an SRM rotor. A first light emitting diode (LED) 702 is disposed on one side of the rotor stack of rotor 500 so as to pass a beam of light 710 through a rotor air-slot hole 506 in the second air-slot layer. A second LED 704 is similarly disposed so as to pass a beam of light 712 through another air-slot hole 504 in the first air-slot layer. Alternatively, a single LED may pass light through air slots of both air-slot layers. A first light detector 706, disposed on the other side of rotor 500, detects light beam 710 as it passes through air slot 506, and a second light detector 708, similarly disposed, detects light beam 712 as it passes through air slot 504.

Light detectors 706, 708 may each be a two state logic device, which sets one logic level when it detects light through the hole. When light does not pass through an air slot within the rotor lamination, due to the obstruction of the light beam by the rotor lamination, a zero signal is obtained.

For a two-phase SRM, first LED 702 is placed so that it corresponds to the active operation of one phase of the SRM, such as phase A, and second LED 704 is placed to correspond with the active operation of the other phase, such as phase B. Similarly, other ways of obtaining the active-operation signals can be easily derived, using the basic principle illustrated here, for use in controlling the operation of the SRM. The control signals may also be obtained with the help of an encoder or a pulse modulation based sensor.

The above-described rotor may be made of a ferromagnetic material, may have any number of rotor poles, and may be used within any SRM having any kind of stator and any number and configuration of stator poles. The rotor may have one or more layers of air slots that are placed below the rotor poles, within the back iron, and may be closer to the rotor shall than to the rotor poles. The air slots may have any shape or form and should have dimensions that leave enough rotor back iron for flux flow, without saturating the rotor laminations. The air slots should be configured so as not to affect the structural integrity of the rotor body. In one embodiment, the width of the rotor back iron existing between air slots 504, 506 and the lower extent of a rotor pole is at least half the rotor pole arc. The air slots may be of regular shapes, such as rectangles, trapezoids, ellipses, or circles and may be laid in many layers around the rotor shaft, with any number of air slots existing within a particular layer. One air slot may be disposed directly under each rotor pole so as to prevent flux from flowing readily beyond a particular distance below the rotor pole.

An LED and an infrared light sensor may be disposed with respect to the above-described rotor so as to generate signals for activating and commutating current in machine phases of an SRM. The air slots may be placed in layers such that the number of layers corresponds to the number of machine phases, so that absolute rotor positions corresponding to current control instants of machine phase windings may be determined. The light sources and sensors may be hung from the stator and attached to the stator pole sides. One light source may be used for all layers of air slots with multiple light sensors detecting the light passed by the flux barriers. The light sensors can be displaced from each other so that the phase shift between phases A and B can be obtained to energize the respective phases; this configuration for obtaining the phase shift has the benefit of requiring only one layer of flux barriers. Alternately, the physical phase shift between the air slots of two layers can be exploited, by having two light sensors and two light sources aligned with them, so that the phase shift between the two machine phases is obtained for energizing the respective phases.

The foregoing has been a detailed description of possible embodiments of the invention. Other embodiments of the invention will be apparent to those skilled in the art from consideration of the specification and practice of the invention. Accordingly, it is intended that this specification and its disclosed embodiments be considered as exemplary only, with a true scope and spirit of the invention being indicated by the following claims.

What is claimed is:

1. An electrical machine rotor comprising:
 a flux-conducting portion, comprising a plurality of salient rotor poles and a portion of back material, that is conducive to conveying an electromagnetic flux; and
 a flux-inhibiting portion that is less conducive to conveying an electromagnetic flux than the flux-conducting portion, wherein the flux inhibiting portion is disposed entirely outside the boundaries of the rotor poles, the flux-inhibiting portion comprising:
  a first plurality of circumferentially-spaced first air slots, wherein each first air slot is aligned with a rotor pole of the plurality of rotor poles; and
  a second plurality of circumferentially-spaced second air slots, wherein each second air slot is aligned with a space between adjacent rotor poles, the second plurality of second slots positioned radially inward from the first plurality of first slots.

2. The electrical machine rotor of claim 1, wherein the radial length of back material existing between the flux-inhibiting portion and a lower-radial boundary of a particular rotor pole is at least half the are of the particular rotor pole.

3. The electrical machine rotor of claim 1, wherein: the portion of the back material forming the flux-conducting portion is disposed circumferentially around the rotor as an annular ring that bounds the outer perimeter of the rotor between adjacent rotor poles, and the outermost radial periphery of the flux-inhibiting portion is closer to the rotational axis of the rotor than is the innermost radial periphery of the annular ring.

4. The electrical machine rotor of claim 3, wherein the distance between the innermost and outermost radial peripheries of the annular ring is at least half the length of the smallest rotor pole arc for the rotor.

5. The electrical machine rotor of claim 1, wherein each first air slot is disposed on a ray extending between the rotational axis of the rotor and one of the plurality of rotor poles.

6. The electrical machine rotor of claim 1, wherein: the outermost radial periphery of each of the second air slots is closer to the rotational axis of the rotor than the innermost radial periphery of each of the first air slots such that a gap is defined therebetween.

7. A switched reluctance machine comprising:
 the electrical machine rotor of claim 1; and
 a stator.

8. The electrical machine rotor of claim 1, wherein adjacent first air slots define a gap therebetween having a circumferential length that is shorter than a circumferential length of each second air slot.

9. An electrical machine rotor comprising:
 a back material;
 a plurality of salient rotor poles radially extending from the perimeter of the back material;
 a flux-conducting portion that is conducive to conveying an electromagnetic flux, the flux-conducting portion comprising the rotor poles and a first portion of the back material; and
 a flux-inhibiting portion that is less conducive to conveying an electromagnetic flux than the flux-conducting portion, wherein: the back material portion forming the flux-conducting portion is disposed circumferentially around the rotor as an annular ring that forms the outer perimeter of the rotor between adjacent rotor poles, and the flux-inhibiting potion is disposed within the back material at a lesser radial distance from the rotational axis of the rotor than the first portion of the back material, the flux-inhibiting portion comprising:

- a first plurality of circumferentially-spaced first air slots, wherein each first air slot is aligned with a rotor pole of the plurality of rotor poles; and
- a second plurality of circumferentially-spaced second air slots, wherein each second air slot is aligned with a space between adjacent rotor poles, the second plurality of second slots positioned radially inward from the first plurality of first slots.

10. The electrical machine rotor of claim 9, wherein the radial length of the annular ring is at least half the arc of any of the rotor poles.

11. The electrical machine rotor of claim 9, wherein the outermost radial periphery of the flux-inhibiting portion is closer to the rotational axis of the rotor than is the innermost radial periphery of the annular ring.

12. The electrical machine rotor of claim 9, wherein each first air slot is disposed on a ray extending between the rotational axis of the rotor and one of the plurality of rotor poles.

13. The electrical machine rotor of claim 9, wherein: the outermost radial periphery of each of the second air slots is closer to the rotational axis of the rotor than the innermost radial periphery of each of the first air slots such that a gap is defined therebetween.

14. A switched reluctance machine comprising:
   the electrical machine rotor of claim 9; and
   a stator.

15. The electrical machine rotor of claim 9, wherein the first plurality of first air slots is circumferentially offset from the second plurality of air slots such that a gap defined between adjacent first air slots is radially aligned with a second air slot and a gap defined between adjacent second air slots is radially aligned with a first air slot.

* * * * *